Mar. 6, 1923.
T. H. KERR
METER SUPPORT
Filed Aug. 5, 1921
1,447,212
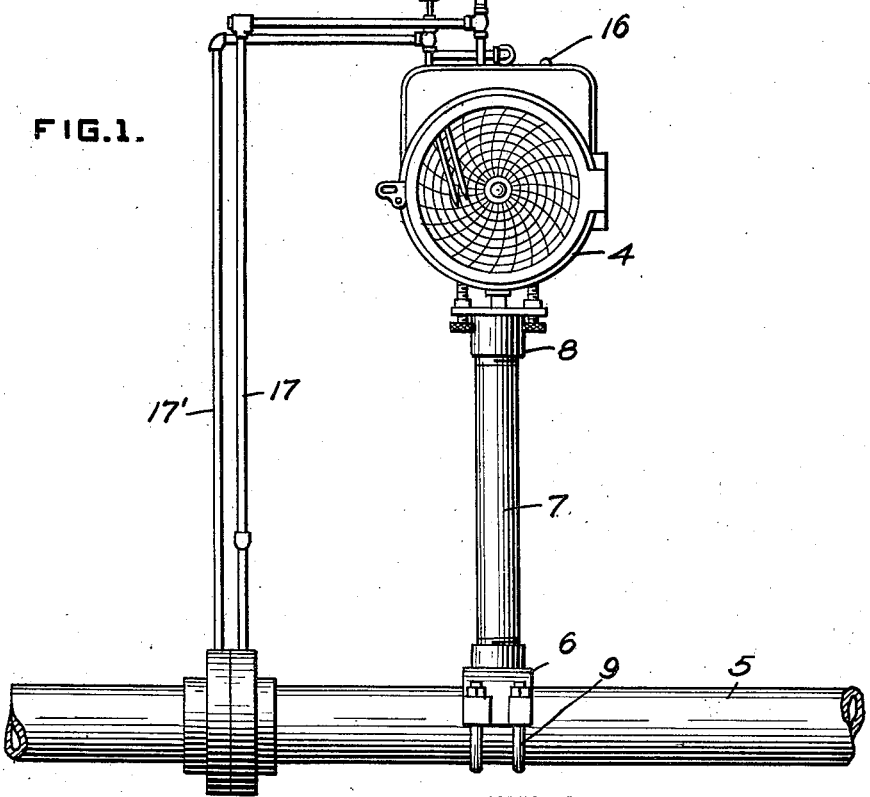
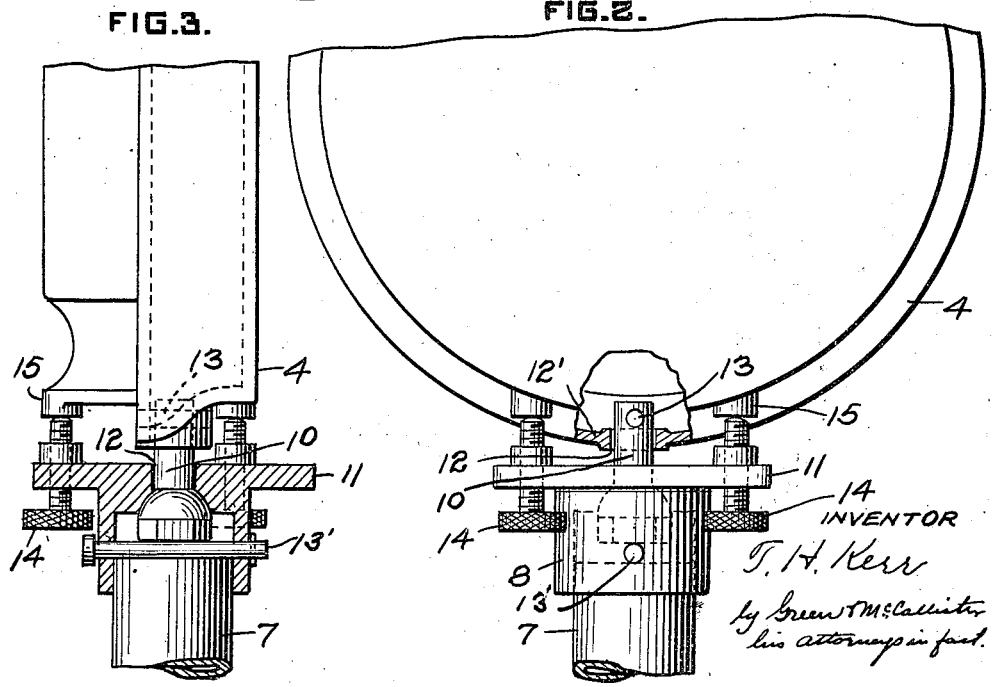
INVENTOR
T. H. Kerr
by Green & McCallister
his attorneys in fact.

Patented Mar. 6, 1923.

1,447,212

UNITED STATES PATENT OFFICE.

THOMAS H. KERR, OF COLUMBUS, OHIO, ASSIGNOR TO PITTSBURGH METER COMPANY, OF EAST PITTSBURGH, PENNSYLVANIA, A CORPORATION OF PENNSYLVANIA.

METER SUPPORT.

Application filed August 5, 1921. Serial No. 490,192.

*To all whom it may concern:*

Be it known that I, THOMAS H. KERR, a citizen of the United States, and a resident of Columbus, in the county of Franklin and State of Ohio, have made a new and useful Invention in Meter Supports, of which the following is a specification.

This invention relates to gage or meter supports and has for an object to produce simple and easy means for mounting and leveling a meter, or gage.

Orifice meters indicate the pressure of a gas or fluid at a point in the line of normal flow and also the pressure at a point in the line of increased velocity of flow. These pressure differences and the static pressure in the line are employed in computing the volume of fluid flowing through the line. The pressures above mentioned are communicated to the pressure chamber of the differential gage through relatively small pipes or passages and it is, therefore, desirable to locate the gage as close to the line as convenient for the purpose of avoiding variations in the pressures transmitted occasioned by the pressure-transmitting pipes or passages. It is customary to mount orifice meters directly on the gas main or line through which the fluid to be metered flows. This is usually done by mounting a saddle on the main and then mounting the differential gage on the saddle or on a support carried by the saddle. No matter what means are employed for mounting the gage, it is essential for it to stand level and an object of this invention is to provide simple and effective means for easily and quickly leveling the meter on its support.

The above mentioned objects, and other objects which will be made more apparent throughout the further description of the invention, are attained by means of the apparatus embodying the features herein illustrated and described in the drawings forming a part hereof.

In the drawings, Figure 1 is a front view of an orifice meter mounted on a gas main and illustrates a support embodying my invention. Fig. 2 is a fragmental view of the gage shown in Fig. 1, on an enlarged scale, and illustrates my improved means for mounting and leveling the gage, a portion of the apparatus being shown in section for convenience of illustration. Fig. 3 is a fragmental side elevation of the apparatus illustrated in Fig. 2, a portion being shown in section for convenience of illustration.

While my invention is applicable to gages of other types, I have illustrated it in connection with a well-known form of orifice meter. As shown, the differential and static gage 4, forming a part of the orifice meter, is mounted on a pipe line or gas main 5. The supporting means for the gage includes a saddle 6 secured to the main, a pedestal 7 secured to the saddle and a support 8 secured to the pedestal. The saddle is preferably a casting having one face conforming in curvature to the peripheral surface of the gas main 5. As shown, the saddle is secured to the main by means of U-shaped bolts or straps 9. The pedestal 7 may consist of a section of pipe and the saddle is provided with a tapped lug into which the pedestal is screwed. The support 8 shown is provided with a tapped aperture and is screwed onto the upper end of the pedestal. The gage is secured in place on the support by means of a coupling best illustrated in Fig. 2. The coupling includes a pin 10 having a cylindrical shank adapted to project upwardly through a cylindrical aperture formed in the base plate 11 of the support and through a cylindrical aperture 12 formed in the casing of the gage. The pin is provided in its shank with a transverse aperture adapted to receive a locking pin or bar 13. The aperture is so located in the shank that the locking bar, when in place, is located above the casing 12′ through which the pin projects. The head of the pin 10 is formed with a partially spherical surface which is engaged by a semi-spherical socket formed in the lower face of the plate 11 and is therefore capable of being tilted to different positions with relation to the plate. A pin 13′ is located in suitable apertures formed in the support 8, and holds the pin in place. With this arrangement, the engagement of the ball-shaped head of the pin with the socket in the lower face of the base plate 11 and the engagement of the bar 13 with the inner face of the casing 12′ positively locks the gage to the support 8. The aperture 12 and the aperture in the plate 11 through which the shank of the pin projects are preferably of greater diameter than the shank of the pin 10 so that the gage casing may be moved to different angular positions with relation to the pin during the operation of adjusting the position and rigidly mounting the gage on the support. The support is also provided with mounting and leveling screws 14, which are shown threaded into the overhanging portion of the base plate 11 of the support 8 and which are adapted to abut against suitable lugs 15 formed on the gage casing. The device illustrated in the drawings is provided with three such screws and cooperating lugs and the gage casing is, therefore, provided with a three-point support. During the operation of leveling and rigidly mounting the gage in place on its support, the pin 10 and locking bar 13 are placed in the positions illustrated and above described. The three screws 14 are then manipulated so that they raise the gage casing above the plate 11 and move the head of the pin 10 into engagement with the socket formed in the lower face of the plate 11 by the lifting force imparted to the pin through the engagement of the locking bar 13 with the inner face of the casing 12'. With the parts arranged as described and illustrated, the pin 10 operates as a tension member, whereas the screws 14 operate as struts or supports and the casing 12' may be swung to different angular positions relative to the surface of the support 8 for the purpose of leveling the gage. This is accomplished by screwing up one or more of the screws 14 and backing off other set screws until the casing is level and at the same time rigidly secured to the support. The top of the meter casing may be provided with spirit levels 16 for facilitating the leveling operation.

Fluid pressure is transmitted from the main through the relatively small pipes 17, 17' and in the case of an orifice meter the connections between these pipes and the main are suitably located with relation to the orifice in the main. It will be apparent that the pipes 17 and 17' are sufficiently long to permit sufficient flexure to accommodate the leveling of the meter without imposing undue strains on the pipe connections.

While I have illustrated but one embodiment of my invention, it will be apparent that various changes and modifications may be made therein without departing from the spirit and scope of the invention as set forth by the appended claims and that the invention may be adapted for use in connection with any type of gages and it is, therefore, not limited to orifice meters.

I claim as my invention:

1. In combination with a pipe line, a saddle seated on or secured to the pipe line, a pedestal secured to the saddle, a gage support secured to said pedestal, a gage pivotally secured to said support, and means between said gage and said support for leveling the gage and rigidly holding it in level.

2. In combination with a pipe line, a saddle seated on and secured to the pipe line, a pedestal secured to the saddle, a gage support element secured to the pedestal, a gage casing element, a pin loosely engaging one of said elements and having a ball-shaped head engaging a socket formed in the other element, and a plurality of adjusting screws between said elements for subjecting said pin to strain and for adjusting the position of the casing element with relation to the support element and for rigidly holding the casing element in the adjusted position.

3. In combination with a pipe line, a saddle partially surrounding said line, means for securing said saddle in place on the line, a pedestal rigidly mounted on said saddle, a support element rigidly mounted on said pedestal, a gage casing element mounted on said support element, a pin loosely engaging one of said elements and having a ball-shaped head engaging a socket formed in the other element, adjusting screws between said elements for subjecting said pin to tension and for adjusting the position of the casing element with relation to the support element and for holding the elements in adjusted position.

In testimony whereof, I have hereunto subscribed my name this 23d day of July, 1921.

THOMAS H. KERR.

Witnesses:
H. I. LONG,
C. E. BICKNELL.